(12) United States Patent
Rivas Sánchez (10) Patent No.: US 10,343,795 B2
(45) Date of Patent: Jul. 9, 2019

(54) SYSTEM FOR SEPARATING SEPARABLE SPACECRAFT AND SHUTTLE ELEMENTS

(71) Applicant: AIRBUS DEFENCE AND SPACE, S.A., Madrid (ES)

(72) Inventor: Francisco Javier Rivas Sánchez, Madrid (ES)

(73) Assignee: AIRBUS DEFENCE AND SPACE, S.A., Madrid (ES)

( * ) Notice: Subject to any disclaimer, the term of this patent is extended or adjusted under 35 U.S.C. 154(b) by 259 days.

(21) Appl. No.: 15/528,470

(22) PCT Filed: Nov. 25, 2014

(86) PCT No.: PCT/ES2014/070865
§ 371 (c)(1),
(2) Date: May 19, 2017

(87) PCT Pub. No.: WO2016/083627
PCT Pub. Date: Jun. 2, 2016

(65) Prior Publication Data
US 2017/0341782 A1    Nov. 30, 2017

(51) Int. Cl.
*B64G 1/64* (2006.01)
*F42B 15/36* (2006.01)

(52) U.S. Cl.
CPC .......... *B64G 1/645* (2013.01); *B64G 1/641* (2013.01); *F42B 15/36* (2013.01)

(58) Field of Classification Search
CPC .......... B64G 1/645; B64G 1/641; F42B 15/36
See application file for complete search history.

(56) References Cited

U.S. PATENT DOCUMENTS 6,076,467 A * 6/2000 Cespedosa ............ B64G 1/641
102/377
6,290,182 B1 * 9/2001 Grunditz ................ B64G 1/641
244/173.1
(Continued)

FOREIGN PATENT DOCUMENTS

CA    2897237 A1 *  1/2016  ............ F16L 37/101
EP    0267279 A1     5/1988
(Continued)

OTHER PUBLICATIONS

International Search Report for PCT/ES2014/070865, dated Jul. 17, 2015.

*Primary Examiner* — Christopher P Ellis
(74) *Attorney, Agent, or Firm* — Merchant & Gould P.C.

(57) ABSTRACT

A separation system for separable elements of spacecraft and launchers includes an upper ring, a lower ring and a band with an inner channel which houses slidable clamps, which are applied against the upper ring and the lower ring that form the connection interface between the two separable elements. A device joins/separates the ends of the band, both the upper ring and the lower ring including an outer protruding element with a wedged section to be lodged in the clamps. The upper ring also has an inner protruding element with a wedged section that matches a channel shaped section in the lower ring, the lower ring also has an outer portion including the outer protruding element with a wedged section and the channel shaped section, the outer portion protruding from a main part of the lower ring and being spaced from it creating a groove.

6 Claims, 6 Drawing Sheets

(56) References Cited

U.S. PATENT DOCUMENTS

| | | | | |
|---|---|---|---|---|
| 8,979,035 B2* | 3/2015 | Straumann | ............ | B64G 1/645 |
| | | | | 244/173.1 |
| 9,828,117 B2* | 11/2017 | Echelman | ............... | B64G 1/645 |
| 10,190,537 B2* | 1/2019 | Scarr | ......................... | F16B 2/08 |
| 2002/0153455 A1* | 10/2002 | Hall | ...................... | B64G 1/002 |
| | | | | 244/171.1 |
| 2003/0198512 A1* | 10/2003 | Arulf | ..................... | B64G 1/641 |
| | | | | 403/338 |
| 2004/0057787 A1* | 3/2004 | Cleveland | ............. | B64G 1/641 |
| | | | | 403/374.1 |
| 2006/0145016 A1* | 7/2006 | Renfro | .................... | B64G 1/64 |
| | | | | 244/158.1 |
| 2007/0080260 A1 | 4/2007 | Lancho Doncel | | |

FOREIGN PATENT DOCUMENTS

| | | | | | |
|---|---|---|---|---|---|
| EP | | 0768241 A1 | 4/1997 | | |
| EP | | 0905022 A1 | 3/1999 | | |
| EP | | 1944237 A1 | 7/2008 | | |
| WO | | 87/07235 A2 | 12/1987 | | |
| WO | | WO-0059783 A2 * | 10/2000 | ............. | B64G 1/641 |

\* cited by examiner

SYSTEM FOR SEPARATING SEPARABLE SPACECRAFT AND SHUTTLE ELEMENTS

This application is a National Stage Application of International Patent Application No. PCT/ES2014/070865, filed Nov. 25, 2014, which application is incorporated herein by reference. To the extent appropriate, a claim of priority is made to the above disclosed application.

FIELD OF THE INVENTION

The present invention relates to a separation system for elements of a spacecraft or a launcher that have to be separated during the flight, for instance, to separate the spacecraft itself from the launcher.

BACKGROUND OF THE INVENTION

Various systems are already known with means for separating parts of a spacecraft, such as a satellite and its launch rocket once the orbit selected for the satellite has been reached. One of these prior art systems is the clamping connection assembly for spacecrafts described in EP 0267279 A1. This clamp joins two separable parts of a spacecraft, each one of which has a bevelled rim which has grooves on its circumference. The clamp comprises retainers internally configured to match the rims of the said separable parts and joined by means of a tensioning band, each retainer including a shearing pin which engages in a corresponding groove of the said rims and transmits loads directly between the two separable parts of the spacecraft.

Another system for attaching and separating satellites is described in EP 0768241 A1. It comprises a fastening piece which is screwed to the upper ring of the adaptor of the launch rocket, a tensioning strip consisting of a two-part metal band, curved metal pieces for fastening the satellite which have a thin-walled cylindrical body with a metal rotational shaft in its lower part formed by several lugs and which rest via their upper part on the lower ring of the satellite, surrounding it and pressing on it, and pressing cams which each have two rotational shafts, one coinciding with that of said metal pieces and the other shared with said piece. The aim of this system is to simplify the securing of the satellite to the launch rocket and its release upon entering into orbit.

EP 0905022 A1 describes a system for attaching and separating satellites which comprises an open ring or metal band which has a channel formed in its inner perimeter, in which jaws are integrated in a discontinuous way, which can slide in the said channel, two end pieces fixed to the ends of the said ring, a tensioning bolt which joins the two end parts, and three supports for retaining the ring which are fixed to the structure of the launcher of a satellite.

EP 1944237 A1 relates to an apparatus for connecting/separating a launch vehicle and a satellite, comprising a strip with an inner channel which slidably houses a plurality of clamps, which is applied against rings that form the connection interface between the two vehicles. The apparatus also comprises means for radially tightening the assembly comprising the strip and clamps, and a device for joining/separating the ends thereof, which, together with locking and unlocking means, includes a mechanism that enables the controlled opening of the strip in two phases, namely: a first phase in which the ends move with contact being maintained with the rings, thereby dissipating the elastic energy corresponding to the tightening of the strip by means of friction; and a second phase in which the strip separates from the rings until a parking position is reached.

One of the drawbacks of these systems is that when the load carrying capability is increased, the tension in the clamp band reaches high values, which increases the shock induced by the separation of the band.

SUMMARY OF THE INVENTION

The object of the invention is to provide a separation system for separable elements of a spacecraft or a launcher that allows high load carrying capability with little band tension and, consequently, being able to reduce the induced release shock.

Another object of the invention is to avoid the failure mode (sliding) of the classical clamp bands.

The invention provides a separation system for separable elements of spacecrafts and launchers that comprises an upper ring, a lower ring and a band with an inner channel which houses a plurality of slidable clamps, which are applied against the upper ring and the lower ring that form the connection interface between the two separable elements, and a device for joining/separating both ends of the band. Both the upper ring and the lower ring comprise each one an outer protruding element with a wedged section to be lodged in the clamps, wherein the upper ring additionally comprises an inner protruding element with a wedged section that matches a channel shaped section in the lower ring. The lower ring also comprises an outer portion that includes the outer protruding element with a wedged section and an inner channel shaped section, the outer portion protruding from the main body of the lower ring and being spaced from it creating a groove.

The design of the separation system of the invention allows an improved functional performance when the release of the band takes place.

Another advantage of the invention is that it allows its use in launcher structures having high diameters submitted to high loads where no debris or shock are allowed.

Other advantageous embodiments will be described in the dependent claims.

BRIEF DESCRIPTION OF THE DRAWINGS

For a more complete understanding of the present invention, it will be described below in greater detail, making reference to the attached drawings, in which.

DETAILED DESCRIPTION OF THE INVENTION

Figure 1:
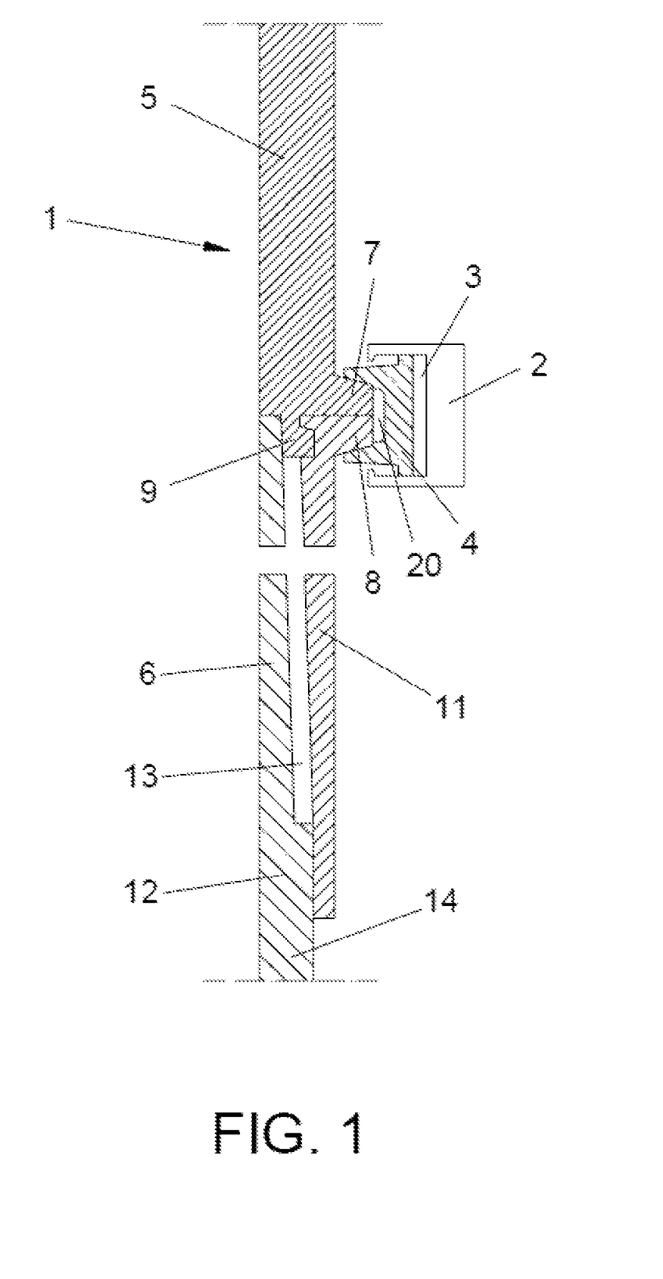
FIG. 1 is a sectional view of the separation system of the invention.

FIG. 1 represents a sectional view of the separation system 1 of the invention including the related upper ring 5 and lower ring 6. It can be seen that the system 1 also comprises a band 2 with an inner channel 3 which houses a plurality of slidable clamps 4 (the assembly clamps-band is represented in FIG. 2) which are applied against the upper ring 5 and the lower ring 6 that form the connection interface between the two separable elements of a spacecraft or a launcher, and that is provided with a device 19 (represented in FIG. 2) for joining/separating the ends of the band 2.

It can also be seen that both the upper ring 5 and the lower ring 6 comprise each one an outer protruding element 7 and 8 with a wedged section to be lodged in the gap 20 of the clamps 4.

The upper ring 5 additionally comprises an inner protruding element 9 with a wedged section that matches a channel shaped section 10 (FIG. 4) in the lower ring 6. The lower ring 6 also comprises an outer portion 11 (fastened in FIG. 4) including the outer protruding element 8 with a wedged section and the channel shaped section 10. The outer portion 11 of the lower ring 6 is spaced from the main body 12 of the lower ring 6, creating a groove 13 between the outer portion 11 and the main body 12 of the lower ring 6. In the system 1 represented in FIG. 1 the outer portion 11 is represented fastened to the base 14 of the main body 12 of the lower ring 6. This outer portion can be fastened or machined integral to the lower ring 6.

Figure 2:
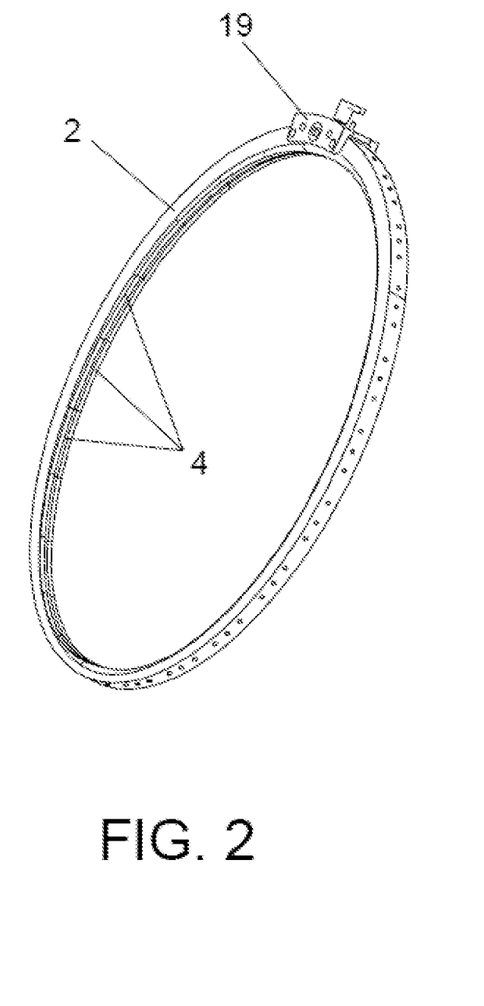
FIG. 2 is a perspective view of the clamp band assembly and the device 19 for joining/separating the ends of the band.

FIG. 2 shows a view of the assembly clamps-band with a device 19 for joining/separating the ends of the band 2.

Figure 3:
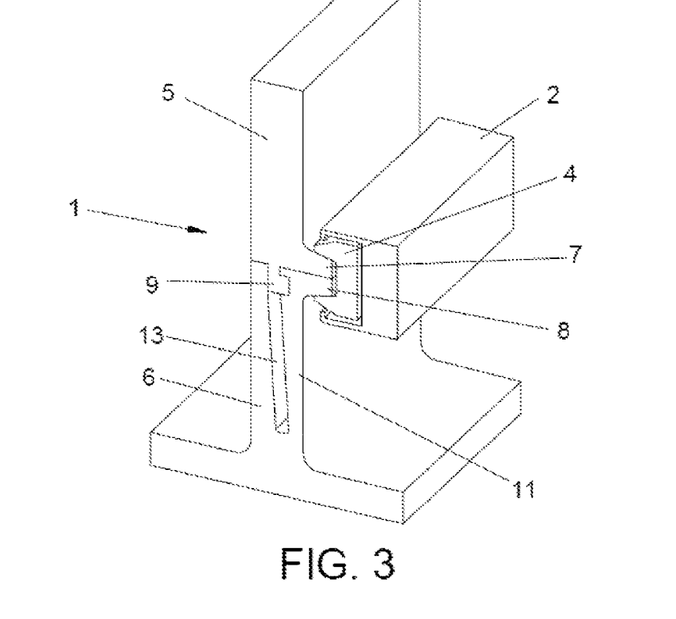
FIG. 3 is a view of a first embodiment of the invention.

FIG. 3 corresponds to a representation of a first embodiment of the invention, in which the outer portion 11 of the lower ring 6 is an integral part of the lower ring 6, the intermediate groove 13 being formed, in this representation, through machining.

Figure 4:
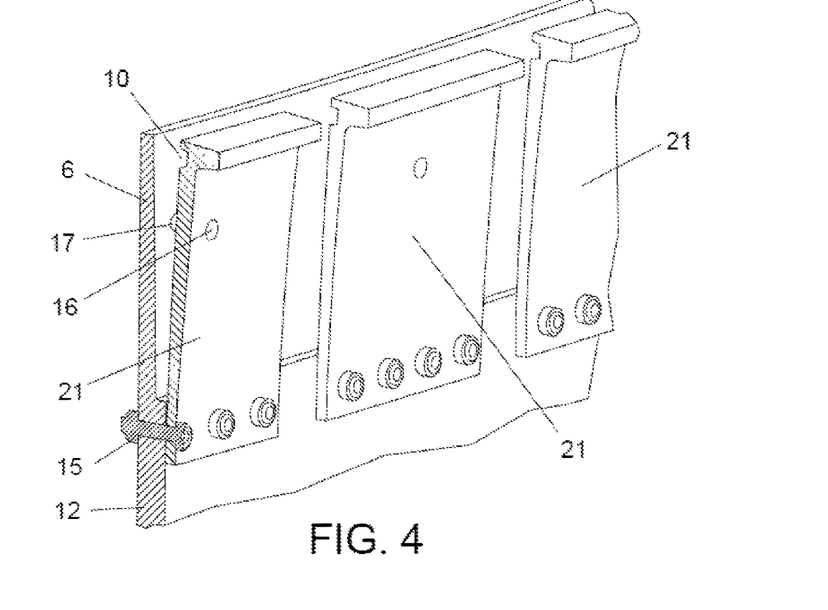
FIG. 4 is a detail of the lower ring, of the second embodiment of the invention.

FIG. 4 corresponds to a representation of the lower ring 6 of an alternative embodiment of the invention, in which the outer portion 11 of the lower ring 6 is a separate part attached to the main part 12 of the lower ring 6 by fastening means 15.

As represented in FIG. 4, the outer portion 11 of the lower ring 6 may be constituted by several plates 21 working as spring plates, attached to the main part 12 of the lower ring 6 by means of screws or fasteners 15.

FIG. 4 also shows that the plates 21 may comprise at least one through hole 16 facing a corresponding through hole 17 on the main part 12 of the lower ring 6. The function of these through holes 16, 17 will be described in detail when describing FIG. 7.

Figure 5:
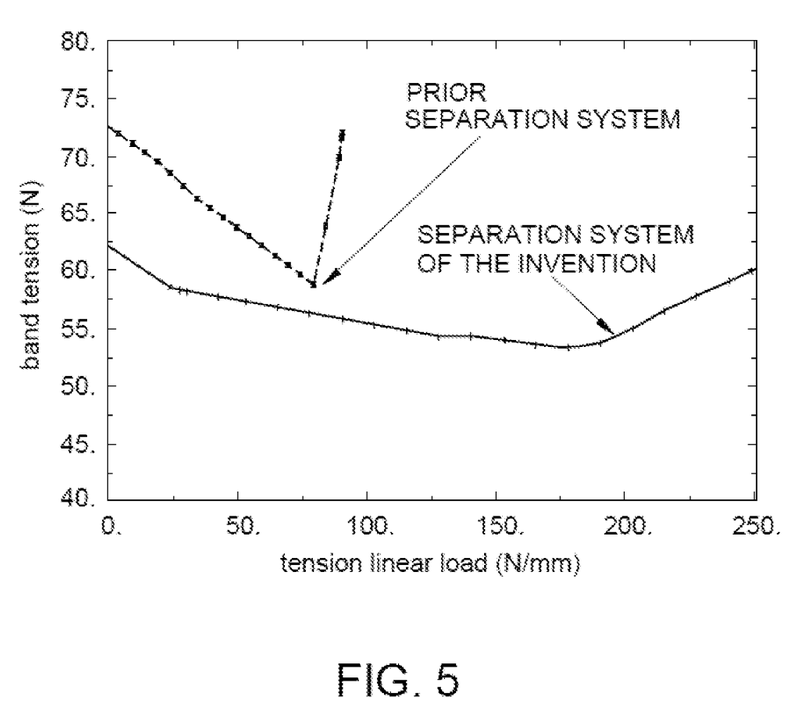
FIG. 5 is a chart load-tension for a prior existing separation systems and for the system of the invention.

FIG. 5 represents a typical chart load-tension for a band in prior existing separation systems and for the separation system 1 of the invention, in this case for a particular diameter of 4.8 m.

It can be seen that in the prior separation systems the failure happens for less than 100 N/mm when the band is tensioned at 72 kN. The chart shows sliding (gap point) at about 80 N/mm.

The system 1 of the invention shows initial instability not before 180 N/mm, and no failure even for more than 250 N/mm. Accordingly, the system 1 of the invention bears higher loads, that do not lead to a significant increase in the band tension, and the failure would be due to deformation.

Figure 6:
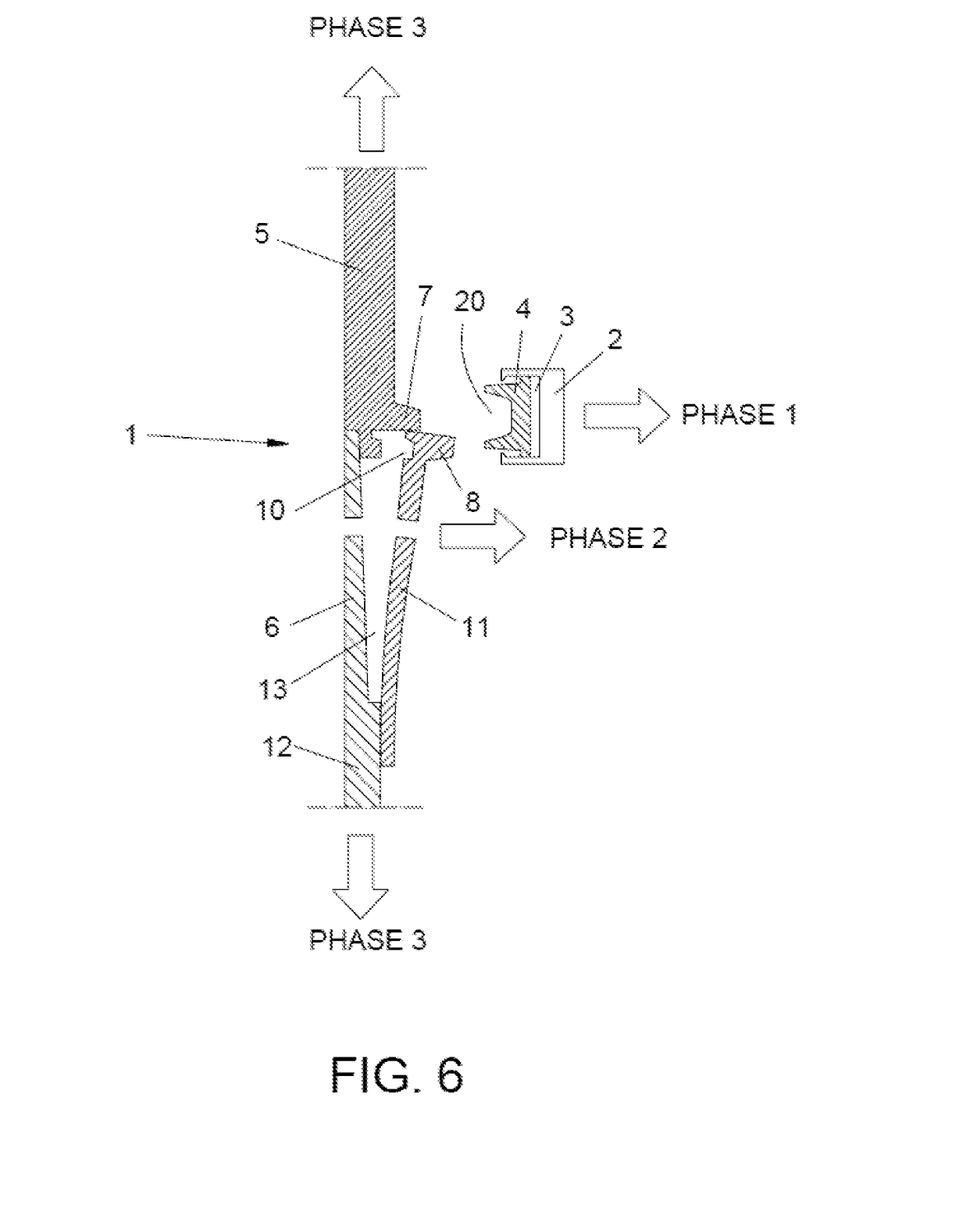
FIG. 6 is a schematic representation of the release process of the two separable elements with a separation system of the invention.

FIG. 6 schematically shows the release process of the two separable elements with a separation system 1 of the invention. In phase 1, the assembly clamps-band loosens (the device 19 acts separating the ends of the band 2), liberating the outer protruding elements 7, 8 with a wedged section of the upper ring 5 and of the lower ring 6 previously lodged in the gap 20 of the clamp 4.

In phase 2 the outer portion 11 of the lower ring 6 is released and opens with respect to the main body 12 of the lower ring 6 due to the effect of the spring energy, causing the inner protruding element 9 with a wedged section of the upper ring 5 to be liberated from the channel shaped section 10 in the outer portion 11 of the lower ring 6 that previously lodged it.

Finally, in phase 3 once the upper ring 5 and the lower ring 6 are completely released, it is possible the separation of both rings (for instance, one belonging to the launcher and the other one to the satellite).

Figure 7:
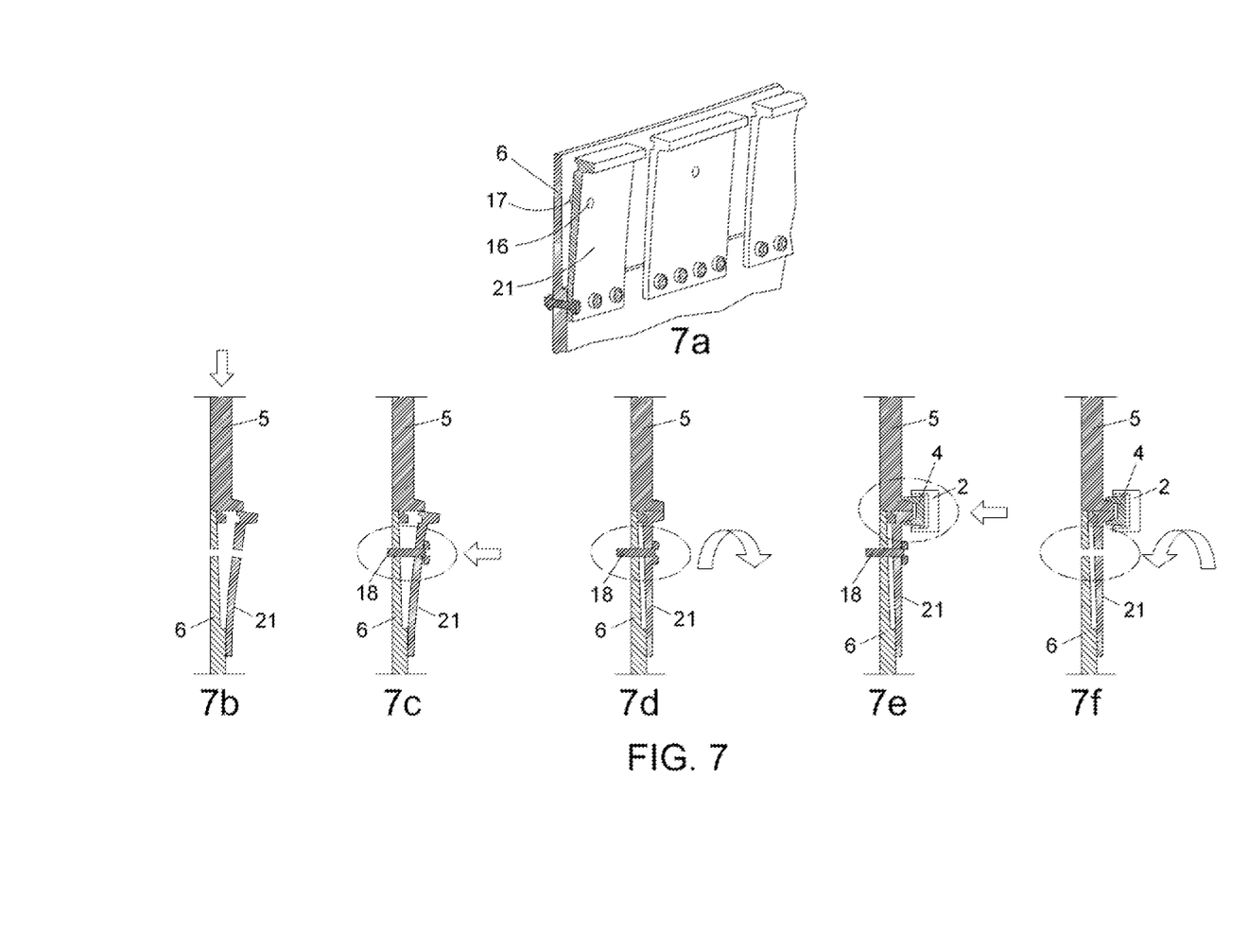
FIGS. 7a to 7f are a representation of the assembling process of the device of the invention.

FIG. 7 shows the installation procedure for the system 1 of the invention, for an embodiment comprising plates 21 with at least one through hole 16, facing another through hole 17 on the main part 12 of the lower ring 6. In step 1 (FIG. 7a) there is represented the lower ring 6 alone. In step 2 (FIG. 7b) the upper ring 5 is placed on top of the lower ring 6. In step 3 (FIG. 7c) a screw 18 is introduced through the holes 16, 17 of the plate 21 and the main body 12 of the lower ring 6. In step 4 (FIG. 7d) the screw 18 is screwed to bring the plate 21 nearer the main body 12 of the lower ring 6 and allowing the inner protruding element 9 with a wedged section to be lodged in the channel shaped section 10 of the plate 21 of the lower ring 6. In step 5 (FIG. 7e) the assembly clamps-band is placed in its working position, with the outer protruding elements 7, 8 with a wedged section of the upper ring 5 and lower ring 6 lodged in the gap 20 of the clamps 4. In step 6 (FIG. 7f) the screw 18 used to bring the plate 21 nearer the main body 12 of the lower ring 6 in step 4 is removed.

Although the present invention has been fully described in connection with preferred embodiments, it is evident that modifications may be introduced within the scope thereof, not considering this as limited by these embodiments, but by the contents of the following claims.

The invention claimed is:

1. Separation system for separable elements of spacecrafts and launchers; the system comprising: an upper ring, a lower ring and a band with an inner channel which houses a plurality of slidable clamps, which are applied against the upper ring and the lower ring that form a connection interface between the two separable elements, and a device for joining/separating ends of the band, both the upper ring and the lower ring comprise an outer protruding element with a wedged section to be lodged in the clamps, the upper ring further comprises an inner protruding element with a wedged section that matches a channel shaped section in the lower ring, the lower ring also comprising an outer portion including the outer protruding element with a wedged section and the inner channel shaped section, the outer portion protruding from a main body of the lower ring and being spaced from the lower ring creating a groove.

2. Separation system for separable elements of spacecrafts and launchers according to claim 1, wherein the outer portion of the lower ring is an integral part of the lower ring.

3. Separation system for separable elements of spacecrafts and launchers according to claim 1, wherein the outer portion of the lower ring is a separate part attached to the main body of the lower ring by a fastener.

4. Separation system for separable elements of spacecrafts and launchers according to claim 3, wherein the outer portion of the lower ring is at least one separate plate attached to the main body of the lower ring by screws or fasteners.

5. Separation system for separable elements of spacecrafts and launchers according to claim 3, wherein the separate part comprises at least one through hole facing a corresponding through hole on the main body of the lower ring.

6. Installation procedure for a separation system for separable elements of spacecrafts and launchers of claim 4, which comprises the following steps:
   placing the upper ring on top of the lower ring;
   introducing a screw through the hole of the plate and through the hole of the main part of the lower ring;
   rotating the screw to bring the plate nearer the rest of the lower ring, allowing the inner protruding element with a wedged section to be lodged in the channel shaped section of the plate;
   placing the assembly clamps-band in a working position, with the outer protruding elements with a wedged section of the upper and lower rings lodged in the gap of the clamps;
   removing the screw used to bring the plate nearer the rest of the lower ring.

\* \* \* \* \*